United States Patent
Wee

(10) Patent No.: US 12,316,759 B2
(45) Date of Patent: May 27, 2025

(54) FUNCTIONAL ENCRYPTION FOR QUADRATIC FUNCTIONS

(71) Applicant: NTT Research, Inc., Sunnyvale, CA (US)

(72) Inventor: Hoeteck Wee, San Francisco, CA (US)

(73) Assignee: NTT Research, Inc., Sunnyvale, CA (US)

( * ) Notice: Subject to any disclaimer, the term of this patent is extended or adjusted under 35 U.S.C. 154(b) by 275 days.

(21) Appl. No.: 18/032,801

(22) PCT Filed: Oct. 22, 2021

(86) PCT No.: PCT/US2021/056324
§ 371 (c)(1),
(2) Date: Apr. 19, 2023

(87) PCT Pub. No.: WO2022/087466
PCT Pub. Date: Apr. 28, 2022

(65) Prior Publication Data
US 2023/0396427 A1    Dec. 7, 2023

Related U.S. Application Data

(60) Provisional application No. 63/104,787, filed on Oct. 23, 2020.

(51) Int. Cl.
*H04L 9/08*    (2006.01)
*H04L 9/00*    (2022.01)
(Continued)

(52) U.S. Cl.
CPC .............. *H04L 9/088* (2013.01); *H04L 9/008* (2013.01); *H04L 9/14* (2013.01); *H04L 9/30* (2013.01); *H04L 9/3093* (2013.01)

(58) Field of Classification Search
CPC ......... H04L 9/3093; H04L 9/008; H04L 9/30; H04L 9/088; H04L 9/14; H04L 9/08; H04L 9/00
See application file for complete search history.

(56) References Cited

U.S. PATENT DOCUMENTS 8,565,435 B2    10/2013    Gentry et al.
2007/0189539 A1    8/2007    Kim et al.
(Continued)

FOREIGN PATENT DOCUMENTS

CA    2291435 A1    9/2004

OTHER PUBLICATIONS

Escala et al., "An Algebraic Framework for Diffie-Hellman Assumptions", https://www.researchgate.net/publication/261211255_An_Algebraic_Framework_for_Diffie-Hellman_Assumptions, Jan. 2013, Journal of Cryptology 2013(1):129-147 (Year: 2013).*

(Continued)

*Primary Examiner* — Kaveh Abrishamkar
*Assistant Examiner* — Howard H. Louie
(74) *Attorney, Agent, or Firm* — CipherLaw

(57) ABSTRACT

The invention relates to systems, methods, network devices, and machine-readable media for improved constructions of public-key functional encryption schemes for quadratic functions. In particular, the present disclosure relates to a new functional encryption scheme to compute quadratic functions so that the data owner controls what can be computed but is not involved in the calculation, and generates a decryption key which allows one to learn a quadratic function evaluation of some encrypted data.

18 Claims, 4 Drawing Sheets

(51) Int. Cl.
*H04L 9/14* (2006.01)
*H04L 9/30* (2006.01)

(56) References Cited

U.S. PATENT DOCUMENTS

2014/0380047 A1* 12/2014 Denning ............... H04L 9/0825
                                                              713/168
2017/0331621 A1* 11/2017 Wikman ............... H04L 9/3271

OTHER PUBLICATIONS

Communication pursuant to Article 94(3) EPC in EPO 21 884 022.1 dated Sep. 16, 2024; 5 pgs.
Extended European search report in 21884022.1; 11 pgs.
Baltico Carmen Elisabetta Zaira et al: "Practical Functional Encryption for Quadratic Functions with Applications to Predicate Encryption", , Jul. 29, 2017 (Jul. 29, 2017), Topics in Cryptology—CT—RSA 2020 : The Cryptographers Track at the RSA Conference 2020, San Francisco, CA, USA, February 24-28, pp. 67-98, 2017.
Yun Kelly et al: "Identity-Based Functional Encryption for Quadratic Functions from Lattices", Oct. 26, 2018 (Oct. 26, 2018), Information and Communications Security; [Lecture Notes in Computer Science; Lect.Notes Computer], Springer International Publishing, Cham, pp. 409-425, 2018.
Wee Hoeteck Ed—Lee Seong-Whan et al: "Attribute-Hiding Predicate Encryption in Bilinear Groups, Revisited", Nov. 5, 2017 (Nov. 5, 2017), SAT 2015 18th International Conference, Austin, TX, USA, Sep. 24-27, 2015; [Lecture Notes in Computer Science; Lect.Notes Computer, Springer, pp. 206-233, 2017.
Michel Abdalla et al: "Functional Encryption for Attribute-Weighted Sums from k-Lin" IACR, International Association for Cryptologic Research.
Search report documents in PCT/US2021/056324; 15 pgs.

* cited by examiner

- Setup($p, 1^{n_1}, 1^{n_2}$): Run $\mathbb{G} = (\mathbb{G}_1, \mathbb{G}_2, \mathbb{G}_T, e) \leftarrow \mathcal{G}(p)$. Sample
$\mathbf{A}_1 \leftarrow \mathbb{Z}_p^{k \times n_1}, \mathbf{A}_2 \leftarrow \mathbb{Z}_p^{k' \times n_2}, \mathbf{A}_0 \leftarrow \mathbb{Z}_p^{k' \times (k'+1)}, \mathbf{W} \leftarrow \mathbb{Z}_p^{(k'+1) \times (k'n_1 + kn_2)}$,
and output
$$\text{mpk} = (\mathbb{G}, [\mathbf{A}_0]_1, [\mathbf{A}_0\mathbf{W}]_1, [\mathbf{A}_1]_1, [\mathbf{A}_1]_2, [\mathbf{A}_2]_2) \quad \text{and} \quad \text{msk} = \mathbf{W}$$

- Enc(mpk, ($\mathbf{z}_1, \mathbf{z}_2$)): Sample $\mathbf{s}_1 \leftarrow \mathbb{Z}_p^k, \mathbf{s}_0, \mathbf{s}_2 \leftarrow \mathbb{Z}_p^{k'}$ and output
$$\text{ct} = (\underbrace{[\mathbf{s}_1\mathbf{A}_1 + \mathbf{z}_1]_1}_{y_1}, \underbrace{[\mathbf{s}_2\mathbf{A}_2 + \mathbf{z}_2]_2}_{y_2}, \underbrace{[\mathbf{s}_0\mathbf{A}_0]_1}_{c_0}, \underbrace{[\mathbf{s}_0\mathbf{A}_0\mathbf{W} + (\mathbf{s}_1 \otimes \mathbf{z}_2 \mid \mathbf{y}_1 \otimes \mathbf{s}_2)]_1}_{y_0}) \in \mathbb{G}_1^{n_1} \times \mathbb{G}_2^{n_2} \times \mathbb{G}_1^{k'+1} \times \mathbb{G}_1^{k'n_1 + kn_2}$$

- KeyGen(msk, $\mathbf{f}$): Output
$$\text{sk}_\mathbf{f} = \left[\mathbf{W} \cdot \begin{pmatrix} (\mathbf{A}_1 \otimes \mathbf{I}_{n_2})\mathbf{f} \\ (\mathbf{I}_{n_1} \otimes \mathbf{A}_2)\mathbf{f} \end{pmatrix}\right]_2 \in \mathbb{G}_2^{(k'+1) \times 1}$$

- Dec($\text{sk}_\mathbf{f}, \mathbf{f}, \text{ct}$): Parse $\text{sk}_\mathbf{f} = [\mathbf{k}^T]_2$ and output the discrete log of
$$[(\mathbf{y}_1 \otimes \mathbf{y}_2) \cdot \mathbf{f}]_T \cdot e([\mathbf{c}_0]_1, [\mathbf{k}^T]_2) \cdot e\left([\mathbf{y}_0]_1, \left[\begin{pmatrix} (\mathbf{A}_1 \otimes \mathbf{I}_{n_2})\mathbf{f} \\ (\mathbf{I}_{n_1} \otimes \mathbf{A}_2)\mathbf{f} \end{pmatrix}\right]_2\right)^{-1}$$

FIG. 2

FUNCTIONAL ENCRYPTION FOR QUADRATIC FUNCTIONS

CROSS-REFERENCE TO RELATED APPLICATIONS

This application is a national stage application, filed under 35 U.S.C. § 371, of International Patent Application No. PCT/US2021/056324, filed Oct. 22, 2021, which claims the benefit of U.S. Provisional Application No. 63/104,787 filed Oct. 23, 2020, the contents of both of which are hereby incorporated in their entireties.

FIELD OF THE INVENTION

The present disclosure relates to improved constructions of public-key functional encryption (FE) schemes for quadratic functions.

BACKGROUND OF THE INVENTION

Functional encryption expands traditional public-key encryption in two different ways: it supports fine-grained access control and it allows learning a function of encrypted data. A decryption key in functional encryption enables a user to learn a specific function of the encrypted data and nothing else. There is a trusted authority that holds a master secret key known only to this authority. When the authority is given the description of some function $f$ as input, it uses its master secret key to generate a derived secret key $sk[f]$ associated with $f$. Anyone holding $sk[f]$ can compute $f(x)$ from an encryption of any x.

Linear functions have been well studied. Consider an example where Alice holds data a=3, b=5. Now, Bob wants to know the value of (a+b), but a and b are encrypted. So, Alice provides access to Bob to compute a function on the encrypted variables a and b. In this way, Bob would get the result of the function in decrypted form without even accessing the decrypted values of the variables. However, the use of quadratic functions is less well studied.

Quadratic functions, as used in functional encryption systems, can have several practical applications. For instance, a quadratic polynomial can express many statistical functions (e.g., (weighted) mean, variance, covariance, root-mean-square), the Euclidean distance between two vectors, and the application of a linear or quadratic classifier (e.g., linear or quadratic regression). However, existing systems can produce very large outputs. Thus, there is a need for functional encryption systems that can efficiently perform functional encryption with quadratic functions in a size-constrained environment.

BRIEF SUMMARY OF THE INVENTION

Some embodiments of the invention include systems, methods, network devices, and machine-readable media for securing computation for $2^{nd}$ degree polynomials by functional encryption, the method comprising executing a computerized set-up algorithm that outputs a public key and a master secret key; executing a computerized key generation algorithm that receives the master secret key, a $2^{nd}$ degree polynomial f, and outputs a secret key; on a first computerized processor, executing an encryption algorithm that receives the public key and an electronic message, the electronic message comprising two vectors z1 and z2, both of length n, and outputs a ciphertext; on a second computerized processor at a location remote from the first computerized processor, receiving the ciphertext and the secret key over an electronic communications network, and executing a decryption algorithm based on the ciphertext and the secret key that outputs a decrypted value that is the same value as evaluating the polynomial specified by f on vectors z1, z2; transmitting the decrypted value to the first computerized processor; and wherein any computationally efficient process does not learn anything about z1, z2 beyond polynomial evaluation.

In some further embodiments, the set-up algorithm further comprises executing a set-up algorithm of an ElGamal scheme twice to generate public keys w1 and w2 and secret keys sk1 and sk2; executing a set-up algorithm of a functional encryption scheme for a $1^{st}$ degree polynomial scheme resulting in a public key w0 and master secret key msk0; and generating output w1, w2, w0 as the public key and msk0 as the master secret key.

In some further embodiments, the encryption algorithm further comprises executing an encryption algorithm of an ElGamal scheme, wherein input to the ElGamal scheme of z1 comprises public key w1 and randomness s1, resulting in a ciphertext y1; executing the encryption algorithm of the ElGamal scheme, where input to the ElGamal scheme comprises public key w2 and randomness s2, resulting in a ciphertext y2; executing an encryption algorithm of a $1^{st}$ degree polynomial scheme, wherein input to the FE1 scheme comprises public key w0 and a vector, the vector comprising a concatenation of s1 times z2 and y1 times s2, resulting in a ciphertext y0; and generating output y1, y2, y0 as the ciphertext.

In some further embodiments, the key generation algorithm executes the key generation algorithm of a 1st degree polynomial scheme, wherein input to the $1^{st}$ degree polynomial scheme comprises the master secret key msk0, and a degree 1 polynomial derived from f, w1 and w2, resulting in a secret key sk; and generating output sk as the secret key.

In some further embodiments, the decryption algorithm further comprises receiving the ciphertext; parsing the ciphertext into components designated y1, y2, y0; receiving a secret key sk, wherein the secret key sk is generated by a $1^{st}$ degree polynomial scheme; computing the $2^{nd}$ degree polynomial f on components y1 and y2, resulting in a value v1; decrypting y0 with sk using the decryption algorithm of the $1^{st}$ degree polynomial scheme resulting in a decrypted value v0; and generating output v1−v0 as the decrypted value.

In some further embodiments, the $2^{nd}$ degree polynomial f is a privacy-preserving machine learning function executed in a neural network with a quadratic activation function. In some further embodiments, the $2^{nd}$ degree polynomial f is a quadratic function and is selected from one or more of a statistical function or a correlation function. Some further embodiments include applying polynomials of the $2^{nd}$ degree polynomial f to projected vectors.

In some further embodiments, the electronic message is arranged and stored as a relational database, the database being logically arranged in a data model that is compatible with operations performed by a specified function; the secret key defines a subset of data in the relational database; and the decryption algorithm performs the specified function on the subset of the data.

BRIEF DESCRIPTION OF THE DRAWINGS

The accompanying drawings, which are included to provide further understanding and are incorporated in and constitute a part of this specification, illustrate disclosed} embodiments, and together with the description, serve to explain the principles of the disclosed embodiments. In the drawings:

FIG. 2 illustrates an example self-contained description of a functional encryption scheme for quadratic functions.

DETAILED DESCRIPTION

Figure 1:
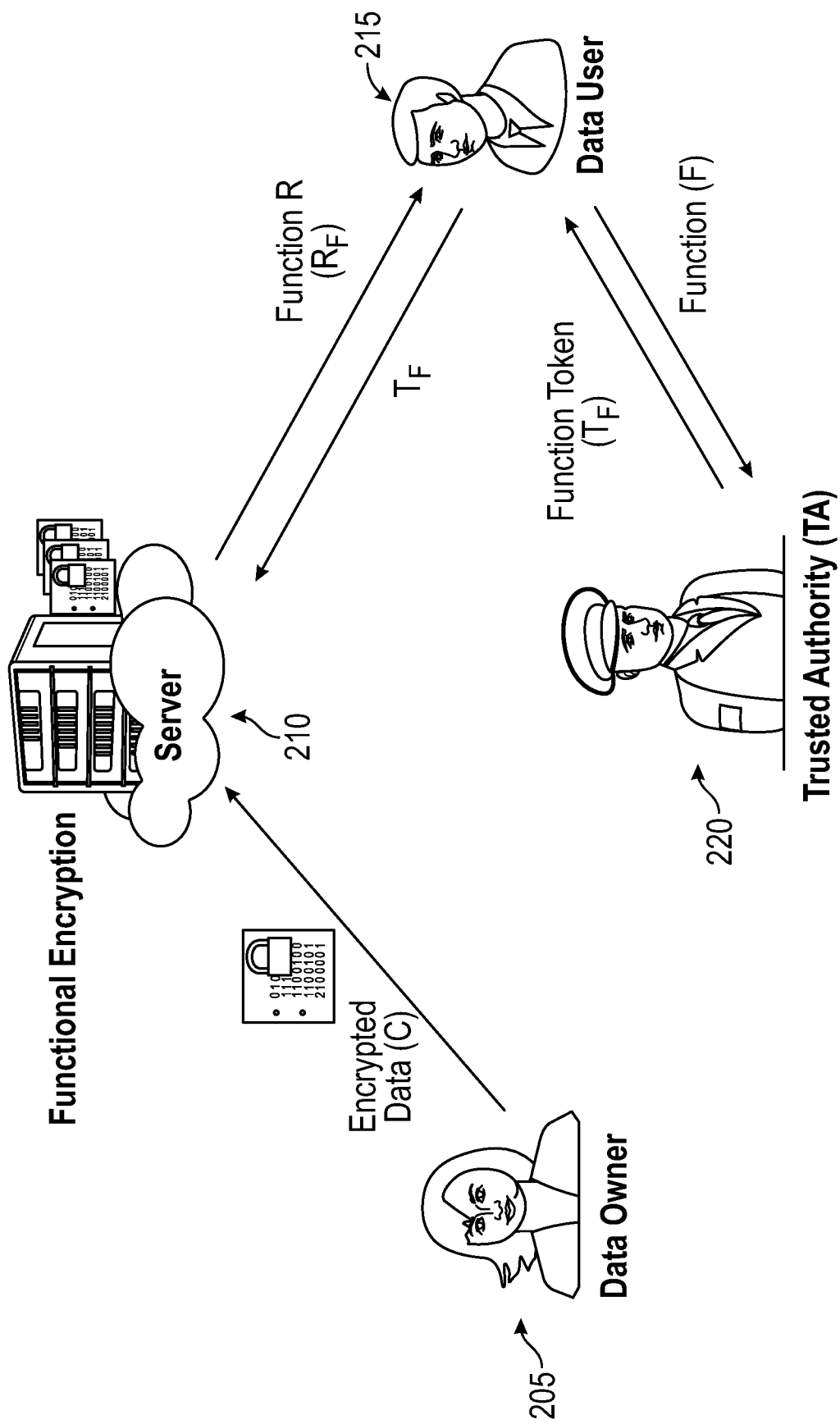
FIG. 1 illustrates an example system architecture for a functional encryption system for quadratic functions.

Disclosed herein is a functional encryption (FE) scheme for quadratic functions with constant-size keys as well as shorter ciphertexts than all prior schemes based on static assumptions. Some embodiments include a public-key partially-hiding FE that supports NC1 computation on public attributes and quadratic computation on the private message, with ciphertext size independent of the length of the public attribute. Both constructions achieve selective, simulation-based security against unbounded collusions, and rely on the (bilateral) k-linear assumption in prime-order bilinear groups. At the core of these constructions is a new reduction from FE for quadratic functions to FE for linear functions.

Embodiments of the invention provide functional encryption for quadratic functions. That is, we would like to encrypt a message z to produce a ciphertext ct, and generate secret keys sk1 for quadratic functions $f$, so that decrypting ct with $sk_f$-returns $f(z)$ while leaking no additional information about z. In addition, we want (i) short ciphertexts that grow linearly with the length of z, as well as (ii) simulation-based security against collusions, so that an adversary holding ct and secret keys for different functions $f_1, f_2, \ldots$ learns nothing about z beyond the outputs of these functions. Functional encryption for quadratic functions have a number of applications, including traitor-tracing schemes whose ciphertext size is sublinear in the total number of users; obfuscation from simple assumptions; as well as privacy-preserving machine learning for neural networks with quadratic activation functions.

Embodiments include new pairing-based public-key functional encryption schemes for quadratic functions, improving upon the recent constructions. Embodiments include: a FE scheme for quadratic functions with constant-size keys, whose ciphertext size is shorter than those of all prior public-key schemes based on static assumptions; moreover, when instantiated over the BLS12-381 curve where $|\mathbb{G}_2|=2|\mathbb{G}_2|$, the ciphertext size can match that of the most efficient scheme in the generic group model; and a partially-hiding FE that supports NC1 computation on public attributes x and quadratic computation on the private message z; moreover, the ciphertext size grows linearly with z and independent of x. The previous constructions have ciphertext sizes that grow linearly with both z and x.

Both constructions achieve at least selective, simulation-based security against unbounded collusions, and rely on the bilateral k-linear assumption in prime-order bilinear groups. At the core of these constructions is a new reduction from public-key FE for quadratic functions to that for linear functions. The reduction relies on the (bilateral) k-Lin assumption, and blows up the input size by a factor k. Note that the trivial reduction blows up the input size by |z|. The inventive reduction is simpler and more direct than the previous reductions: (i) it does not require function-hiding FE for linear functions, and (ii) the inventive reduction works directly in the public-key setting. Because of (i), the embodiments disclosed herein can also decrease the secret key size from linear to constant.

An overview of example constructions is disclosed. We rely on an asymmetric bilinear group $(\mathbb{G}_1, \mathbb{G}_2, \mathbb{G}_T, e)$ of prime order p where $e: \mathbb{G}_1 \times \mathbb{G}_2 \to \mathbb{G}_T$. We use $[\cdot]_1, [\cdot]_2, [\cdot]_T$ to denote component-wise exponentiations in respective groups $\mathbb{G}_1, \mathbb{G}_2, \mathbb{G}_T$. We use boldface lower case to denote row vectors. The k-Lin assumption in $\mathbb{G}_b$ asserts that $$([A]_b, [sA]_b) \approx_c ([A]_b, [u]_b), s \leftarrow \mathbb{Z}_p^k, A \leftarrow \mathbb{Z}_p^{k \times \ell}, u \leftarrow \mathbb{Z}_p^\ell$$
$$\ell > k$$

The bilateral k-Lin assumption is a strengthening of k-Lin, and asserts that $$([A]_1, [sA]_1, [A]_2, [sA]_2) \approx_c ([A]_1, [A]_1, [A]_2, [u]_2)$$

Note that bilateral 1-Lin is false, for the same reason DDH is false in symmetric bilinear groups.

Functional Encryption for Quadratic Functions

Consider the class of quadratic functions over $\mathbb{Z}_p^k \times \mathbb{Z}_p^n$ given by $$(z_1, z_2) \to (z_1 \otimes z_2) f^T$$

where $f \in \mathbb{Z}_p^{n^2}$ is the coefficient vector. We will first mask $z_1$, $z_2$ in the ciphertext using:

$$[s_1 A_1 + z_1]_1, [s_2 A_2 + z_2]_2$$

where the matrices $$[A_1]_1, [A_2]_2, A_1, \mathbb{Z}_p^{k \times n}$$

are specified in the master public key. Next, observe that $$((s_1 A_1 + z_1) \otimes (s_2 A_2 + z_2)) f^T = (z_1 \otimes z_2) f^T + \text{cross terms} \quad (1)$$

We will express the cross terms as a linear function evaluated on inputs of length O(kn); the key difference in this work is that the linear function can be derived from the master public key and f.

More precisely, we write $$\underbrace{(s_1 A_1 + z_1)}_{y_1} \otimes \underbrace{(s_2 A_2 + z_2)}_{y_2} = (z_1 \otimes z_2) + s_1 A_1 \otimes z_2 \quad + y_1 \otimes s_2 A_2$$

$$= (z_1 \otimes z_2) + (s_1 \otimes z_2) \cdot (A_1 \otimes I_n) \quad + (y_1 \otimes s_2) \cdot (I_n \otimes A_2)$$

$$= (z_1 \otimes z_2) + (s_1 \otimes z_2 \| y_1 \otimes s_2) \begin{pmatrix} A_1 \otimes I_n \\ I_n \otimes A_2 \end{pmatrix}$$

where the second equality uses the mixed-product property of the tensor product, which tells us that $(M_1 \otimes M_2)(M_3 \otimes M_4) = (M_1 M_3) \otimes (M_2 M_4)$, and $\|$ denotes row vector concatenation. Multiplying both sides on the right by $f^T$ and rearranging the terms yields:

$$(z_1 \otimes z_2) f^T = (y_1 \otimes y_2) f^T - (s_1 \otimes z_2 \| y_1 \otimes s_2) M f^T \quad (2)$$

where $$M := A_1 \otimes I_{n_{I_\eta \otimes A_2}}.$$

As we mentioned earlier, the boxed term (=cross terms in (1))

$$(s_1 \otimes z_2 \| y_1 \otimes s_2) \cdot M f^T \quad (3)$$

corresponds to a linear computation where the input $(s_1 \otimes z_2 \| y_1 \otimes s_2)$ has length $O(kn)$; and the linear function $Mf^T$ can be computed given f and the matrices $A_1$, $A_2$ in the public key.

The latter property pertaining to $Mf^T$ is what allows us to significantly simplify the previous reductions, since there is nothing "secret" about the linear function $Mf^T$. In the prior works, the linear function leaks information about the master secret key beyond what can be computed from the master public key.

In particular, we can use a public-key FE for linear functions (linear FE for short) to compute (3). That is, we encrypt $[s_1 \otimes z_2 \| y_1 \otimes s_2]_1$, and generate a secret key for $[Mf^T]_2$. Certain linear FE schemes extend readily to this setting where both the input and function are specified "in the exponent"; moreover, these schemes achieve selective, simulation-based security under the k-Lin assumption, with constant-size secret keys. The linear FE ciphertext would lie in $\mathbb{G}_1$, whereas both M and the secret key would lie in $\mathbb{G}_2$. Note that in order to compute $[M]_2$, we would also publish $[A_1]_2$ in the public key. A self-contained description of the quadratic FE is disclosed herein.

Security Overview

First, observe that $[y_1]_1$, $[y_2]$ leaks no information about $z_1$, $z_2$, because of the k-Lin assumption;

Next, we can simulate the ciphertext and secret key for the linear FE given $(s_1 \otimes z_2 \| y_1 \otimes s_2) Mf^T$, which we can rewrite as $(z_1 \otimes z_2) f^T - (y_1 \otimes y_2) f^T$. We can in turn compute the latter given just $y_1$, $y_2$ and the output of the ideal functionality and therefore the linear FE ciphertext-key pair leaks no additional information about $z_1$, $z_2$.

In the reduction, we would need to compute $[y_1 \otimes y_2]_2$ in order to simulate the secret key for the linear FE. This is something we can compute given either $y_1$, $[y_2]_2$ or $[y_1]_2$, $y_2$. The latter along with publishing $[A_1]_2$ in the public key is why we require the bilateral k-Lin assumption. For the most efficient concrete instantiation, we will use the bilateral 2-Lin assumption together with SXDH (i.e., 1-Lin), where we sample $A_1 \leftarrow \mathbb{Z}_p^{k \times \ell \; 2 \times n}$, $A_2 \leftarrow \mathbb{Z}_p^{k \times \ell \; 1 \times n}$. We leave the question of basing quadratic FE solely on the standard k-Lin assumption as an open problem.

Extension to Partially Hiding Functional Encryption (PHFE)

The inventive approach extends readily to partially hiding FE (PHFE) for the class $$\begin{pmatrix} \overset{public}{X}, \overset{private}{(Z_1,Z_2)} \end{pmatrix} \mapsto (z_1 \otimes z_2) f(x)^T$$

where $f$ captures NC1—more generally, any arithmetic branching program-computation on the public attribute x and outputs a vector $\mathbb{Z}_p^{k \times \ell \; n^2}$. Note that FE for quadratic functions corresponds to the special case where $f$ is a constant function (independent of x). The idea behind the extension to PHFE is to replace $f^T$ in (2) with $f(x)$ (the decryptor can compute $f(x)$ since x is public), which yields:

$$(z_1 \otimes z_2) f(x)^T = (y_1 \otimes y_2) f(x)^T - (s_1 \otimes z_2 \| y_1 \otimes s_2) Mf(x)^T$$

To compute the new boxed term, we will rely on a partially-hiding linear FE scheme for the class $$\begin{pmatrix} \overset{public}{X}, \overset{private}{Z} \end{pmatrix} \mapsto zf(x)^T$$

We can augment the construction to take into account the matrix M; some care is needed as the decryption algorithm only gets $[M]_2$ and not M. In the ensuing scheme, the ciphertext size grows linearly with the message and independent of x, which we then inherit in our partially-hiding quadratic FE.

Notations

We denote by $s \leftarrow S$ the fact that s is picked uniformly at random from a finite set S. We use $\approx_s$ to denote two distributions being statistically indistinguishable, and $\approx_c$ to denote two distributions being computationally indistinguishable. We use lower case boldface to denote row vectors and upper case boldface to denote matrices. We use $e_i$ to denote the $i'^{th}$ elementary row vector (with 1 at the $i'^{th}$ position and 0 elsewhere, and the total length of the vector specified by the context). For any positive integer N, we use [N] to denote $\{1,2,\ldots,N\}$.

The tensor product (Kronecker product) for matrices $A=(a_{i,j}) \in \mathbb{Z}^{\ell \times m}$, $B \in \mathbb{Z}_p^{k \times \ell \; n \times p}$ is defined as $$A \otimes B = \begin{bmatrix} a_{1,1}B, & \ldots, & a_{1,m}B \\ \ldots, & \ldots, & \ldots \\ a_{\ell,1}B, & \ldots, & a_{\ell,m}B \end{bmatrix} \in \mathbb{Z}^{\ell n \times mp}.$$

The mixed-product property for tensor product says that $$(A \otimes B)(C \otimes D) = (AC) \otimes (BD)$$

Arithmetic Branching Programs

A branching program is defined by a directed acyclic graph (V, E), two special vertices $v_0, v_1 \in V$ and a labeling function $\Phi$. An arithmetic branching program (ABP), where p is a prime, computes a function $f: \mathbb{Z}_p^{k \times \ell \; n}{}_p \to \mathbb{Z}_p^{k \times \ell}{}_p$. Here, $\Phi$ assigns to each edge in E an affine function in some input variable or a constant, and $f(x)$ is the sum over all $v_0$–$v_1$ paths of the product of all the values along the path. We refer to $|V|+|E|$ as the size of $f$. The definition extends in a coordinate-wise manner to functions $f: \mathbb{Z}_p^{k \times \ell \; n}{}_p \to \mathbb{Z}_p^{k \times \ell \; n'}{}_p$. Henceforth, we use $\mathfrak{F}_{ABP,n,n'}$ to denote the class of ABP $f$: $\mathbb{Z}_p^{k \times \ell \; n}{}_p \to \mathbb{Z}_p^{k \times \ell \; n'}{}_p$.

We note that there is a linear-time algorithm that converts any boolean formula, boolean branching program or arithmetic formula to an arithmetic branching program with a constant blow-up in the representation size. Thus, ABPs can be viewed as a stronger computational model than all of the above. Recall also that branching programs and boolean formulas correspond to the complexity classes LOGSPACE and NC1 respectively.

Prime-Order Bilinear Groups

A generator $\mathcal{G}$ takes as input a security parameter $1^\lambda$ and outputs a description $\mathbb{G} := (p, \mathbb{G}_1, \mathbb{G}_2, \mathbb{G}_T, e)$, where p is a prime of $\Theta(\lambda)$ bits, $\mathbb{G}_1, \mathbb{G}_2$ and $\mathbb{G}_T$ are cyclic groups of order p, and $e: \mathbb{G}_1 \times \mathbb{G}_2 \to \mathbb{G}_T$ is a non-degenerate bilinear map. We require that the group operations in $\mathbb{G}_1$, $\mathbb{G}_2$, $\mathbb{G}_T$ and the bilinear map e are computable in deterministic polynomial time in $\lambda$. Let $g_1 \in \mathbb{G}_1$, $g_2 \in \mathbb{G}_2$ and $g_T = e(g_1, g_2) \in \mathbb{G}_T$ be the respective generators. We employ the implicit representation of group elements: for a matrix M over $\mathbb{G}_p$, we define $[M]_1 := g_1^M$, $[M]_2 := g_2^M$, $[M]_T := g_T^M$, where exponentiation is carried out component-wise. Also, given $[A]_1$, $[B]_2$, we let $e([A]_1, [B]_2) = [AB]_T$. We recall the matrix Diffie-Hellman (MDDH) assumption on $\mathbb{G}_1$:

Assumption 1 (MDDH$_{k,k}^d$, Assumption)

Let $k, \ell, d \in \mathbb{N}$. We say that the MDDH$_{k,\ell}^d$ assumption holds it for all PPT adversaries $\mathcal{A}$, the following advantage function is negligible in $\lambda$.

$$\mathrm{Adv}_{\mathcal{A}}^{\mathrm{MDDH}_{k,\ell}^d}(\lambda) := |Pr[\mathcal{A}(\mathbb{G}, [M]_1, [MS]_1) = 1] - Pr[\mathcal{A}(\mathbb{G}, [M]_1, [U]_1) = 1]|$$

where $\mathbb{G} = (p, \mathbb{G}_1, \mathbb{G}_2, \mathbb{G}_T, e) \leftarrow \mathcal{G}(1^\lambda)$, $M \leftarrow \mathbb{Z}_p^{\ell \times k}$, $S \leftarrow \mathbb{Z}_p^{k \times d}$ and $U \leftarrow \mathbb{Z}_p^{\ell \times d}$.

The MDDH assumption on $\mathbb{G}_2$ can be defined in an analogous way. It is established that $$k\text{-}Lin \Rightarrow MDDH_{k,k+1}^1 \Rightarrow MDDH_{k,\ell}^d \;\forall k, d \geq 1, \ell > k$$

with a tight security reduction. (In the setting where $\ell \leq k$, the MDDH$_{k,\ell}^d$ assumption holds unconditionally.)

The bilateral MDDH assumption is defined analogously with the advantage function:

$$|Pr[\mathcal{A}(\mathbb{G}, [M]_1, [MS]_1, [M]_2, [MS]_2) = 1] - Pr[\mathcal{A}(\mathbb{G}, [M]_1, [M]_2, [U]_2) = 1]|$$

Partially-Hiding Functional Encryption (PHFE)

We recall the notion of partially-hiding functional encryption for the function class $$(x, z) \in \mathbb{Z}_p^n \times \mathbb{Z}_p^{n'} \mapsto h(z)f(x)^T$$

where $h: \mathbb{Z}_p^{n'} \Theta \mathbb{Z}_p^{n''}$ is fixed and $f \in \mathcal{F}_{ABP,n,n''}$ is specified by the secret key. We will be primarily interested in the settings $h(z) = z$ and $h(z_1, z_2) = z_1 \otimes z_2$, which generalize FE for linear functions and quadratic functions respectively.

Syntax

A partially-hiding functional encryption scheme (PHFE) consists of four algorithms:

Setup($1^\lambda, 1^n, 1^{n'}, h$): The setup algorithm gets as input the security parameter $1^\lambda$ and function parameters $1^n$, $1^{n'}$ and h: $\mathbb{Z}_p^{n'} \to \mathbb{Z}_p^{n''}$. It outputs the master public key mpk and the master secret key msk.

Enc(mpk, x, z): The encryption algorithm gets as input mpk and message $x, z \in \mathbb{Z}_p^n \times \mathbb{Z}_p^{n'}$. It outputs a ciphertext $ct_{(x,z)}$ with x being public.

KeyGen(msk, $f$): The key generation algorithm gets as input msk and a function $f \in \mathcal{F}_{ABP,n,n''}$. It outputs a secret key $sk_f$ with $f$ being public.

Dec(($sk_f, f$), ($ct_{(x,z)}, x$)): The decryption algorithm gets as input $sk_f$ and $ct_{(x,z)}$ along with $f$ and x. It outputs a value in $\mathbb{Z}_p$.

Correctness

For all $(x, z) \in \mathbb{Z}_p^n \times \mathbb{Z}_p^{n'}$ and $f \in \mathcal{F}_{ABP,n,n''}$, we require $$Pr\left[ Dec((ct_{(x,z)}, x), (sk_f, f)) = h(z)f(x)^T : \begin{array}{l} (mpk, msk) \leftarrow \mathrm{Setup}(1^\lambda, 1^n, 1^{n'}, h) \\ sk_f \leftarrow \mathrm{KeyGen}(msk, f) \\ ct_{(x,z)} \leftarrow \mathrm{Enc}(mpk, x, z) \end{array} \right] = 1.$$

Relaxation of Correctness

The disclosed scheme achieves a relaxation of correctness where the decryption algorithm takes an additional bound $1^B$ (and runs in time polynomial in B) and outputs $h(z)f(x)^T$ if the value is bounded by B. This feature is also present in prior works on (IP)FE from DDH and bilinear groups, due to the reliance on brute-force discrete log to recover the answer "from the exponent". The relaxation only refers to functionality and does not affect security.

Security Definition

We consider semi-adaptive (strengthening of selective), simulation-based security, which stipulates that there exists a randomized simulator (Setup*, Enc*, KeyGen*) such that for every efficient stateful adversary $\mathcal{A}$, $$\left[ \begin{array}{l} (mpk, msk) \leftarrow \mathrm{Setup}(1^\lambda, 1^n, 1^{n'}, h); \\ (x^*, z^*) \leftarrow \mathcal{A}(mpk); \\ ct^* \leftarrow \mathrm{Enc}(mpk, (x^*, z^*)); \\ \mathrm{output} \; \mathcal{A}^{KeyGen(msk, \cdot)}(mpk, ct^*) \end{array} \right] \approx_c$$

$$\left[ \begin{array}{l} (mpk, msk^*) \leftarrow \mathrm{Setup}^*(1^\lambda, 1^n, 1^{n'}, h); \\ (x^*, z^*) \leftarrow \mathcal{A}(mpk); \\ ct^* \leftarrow \mathrm{Enc}^*(msk^*, x^*); \\ \mathrm{output} \; \mathcal{A}^{KeyGen^*(msk^*, x^*, \cdot, \cdot)}(mpk, ct^*) \end{array} \right]$$

such that whenever $\mathcal{A}$ makes a query $f$ to KeyGen, the simulator KeyGen* gets $f$ along with $h(z^*)f(x^*)^T$. We use $\mathrm{Adv}_{\mathcal{A}}^{FE}(\lambda)$ to denote the advantage in distinguishing the real and ideal games.

Main Construction

In this section, we present our PHFE scheme for the class $$(\overset{public}{\overline{x}}, \overset{private}{\overline{(z_1, z_2)}}) \in \mathbb{Z}_p^n \times \mathbb{Z}_p^{n'_1 + n'_2} \mapsto (z_1 \otimes z_2)f(x)^T, \; f \in \mathcal{F}_{ABP, n, n'_1 n'_2}$$

The scheme is SA-SIM-secure under the bilateral k-Lin assumption and the k'-Lin assumption in $\mathbb{G}_1$, $\mathbb{G}_2$ (for the most efficient concrete instantiation, we set k=2, k'=1). In the scheme, decryption actually computes $[(z_1 \otimes z_2)f(x)^T]_T$, whereas the simulator only needs to get $[(z_1 \otimes z_2)f(x)^T]_2$. Note that FE for quadratic functions is a special case of the PHFE (where $f$ has the quadratic function hard-wired into it). A self-contained description of our quadratic FE is disclosed herein.

As a building block, we rely on a SA-SIM-secure PHFE scheme (Setup$_0$, Enc$_0$, KeyGen$_0$, Dec$_0$) for the class $$(\overset{public}{\overline{x}}, \overset{private}{\overline{z}}) \in \mathbb{Z}_p^n \times \mathbb{Z}_p^{k' n'_1 + k n'_2} \mapsto [zMf(x)^T]_T, \; f \in \mathcal{F}_{ABP, n, n'_1 n'_2}$$

parameterized by a matrix $[M]_2 \in \mathbb{G}_1^{(k'n'_1+kn'_2) \times n'_1 n'_2}$ where encryption gets $[z]_1$ and the simulator gets $[zMf(x)^T]_2$. Methods to instantiate the building block are disclosed herein.

Scheme

Setup$(p, 1^n, 1^{n'_1}, 1^{n'_2})$: Run $\mathbb{G} = (\mathbb{G}_1, \mathbb{G}_2, \mathbb{G}_T, e) \leftarrow \mathcal{G}(p)$.
Sample $A_1 \leftarrow \mathbb{Z}_p^{k \times n'_1}, A_2 \leftarrow \mathbb{Z}_p^{k \times n'_2}, (mpk_0, msk_0) \leftarrow \text{Setup}_0(p, 1^n, 1^{k'n'_1+kn'_2}, [M]_2)$ where $$M := A_1 \otimes I_{n'_2} I_{n'_1} \otimes A_2 \in \mathbb{Z}_p^{(k'n'_1+kn'_2) \times n'_1 n'_2}$$

and output $mpk = (\mathbb{G}, [A_1]_1, [A_1]_2, [A_2]_2, mpk_0)$ and $msk = msk_0$ Observe that given mpk, we can compute $[M]_2$.

Enc(mpk, x, $(z_1, z_2)$): Sample $s_1 \leftarrow \mathbb{Z}_p^k, s_0, s_2 \leftarrow \mathbb{Z}_p^{k'}, ct_0 \leftarrow Enc_0\left(mpk_0, x, [s_1 \otimes z_2 \| \underbrace{(s_1 A_1 + z_1)}_{y_1} \otimes s_2]_1\right)$ and output $$ct = ([\underbrace{s_1 A_1 + z_1}_{y_1}]_1, [\underbrace{s_2 A_2 + z_2}_{y_2}]_2, ct_0)$$

KeyGen(msk, $f$): Output $sk_f \leftarrow \text{KeyGen}_0(msk_0, f)$

Dec($sk_f$, $f$, ct, x): Output $[y_1 \otimes y_2) \cdot f(x)^T]_T \cdot (Dec_0(sk_f, (f, [M]_2), ct_0, x))^{-1}$ Correctness First, observe that we have $$(\underbrace{s_1 A_1 + z_1}_{y_1}) \otimes (\underbrace{s_2 A_2 + z_2}_{y_2}) = (z_1 \otimes z_2) + s_1 A_1 \otimes z_2 + y_1 \otimes s_2 A_2 \quad (4)$$

$$= (z_1 \otimes z_2) + (s_1 \otimes z_2) \cdot (A_1 \otimes I_{n'_2}) + (y_1 \otimes s_2) \cdot (I_{n'_1} \otimes A_2)$$

$$= (z_1 \otimes z_2) + (s_1 \otimes z_2 \| y_1 \otimes s_2) M$$

where the second equality uses the mixed-product property of the tensor product. Multiplying both sides of (4) by $f(x)^T$ and rearranging the terms yields:

$(z_1 \otimes z_2) f(x)^T = y_1 \otimes y_2) f(x)^T - (s_1 \otimes z_2 \| y_1 \otimes s_2) M f(x)^T$ (5)

Next, correctness of the underlying scheme tells us that $Dec_0(sk_f, (f, [M]_2), ct_0, x) = (s_1 \otimes z_2 \| y_1 \otimes s_2) M f(x)^T$ Correctness then follows readily.

Simulator

We start by describing the simulator.

Setup*$(p, 1^n, 1^{n'_1}, 1^{n'_2})$: Run $\mathbb{G} = (\mathbb{G}_1, \mathbb{G}_2, \mathbb{G}_T, e) \leftarrow \mathcal{G}(p)$.
Sample $A_1 \leftarrow \mathbb{Z}_p^{k \times n'_1}, A_2 \leftarrow \mathbb{Z}_p^{k \times n'_2}, (mpk_0^*, msk_0^*) \leftarrow \text{Setup}_0^*(p, 1^n, 1^{k'n'_1+kn'_2})$ and output $mpk^* = (\mathbb{Z}, [A_1]_1, [A_1]_2, [A_2]_2, mpk_0^*)$ and $msk^* = msk_0^*$ Enc*(msk$_0^*$, x*): Sample $y_1 \leftarrow \mathbb{Z}_p^{n'_1}, y_2 \leftarrow \mathbb{Z}_p^{n'_2}, ct_0^* \leftarrow Enc_0^*(msk_0^*, x^*)$ and output $ct^* = ([y_1]_1, [y_2]_1, ct_0^*)$ KeyGen*(msk*, x*, $\theta$, $[\mu]_2$): Output $sk_f \leftarrow \text{KeyGen}_0^*(msk_0^* + x^*, f, [(y_1 \otimes y_2) f(x^*)]_T \cdot [\mu]_2^{-1})$ Partially-Hiding Functional Encryption (PHFE) for Linear Functions Disclosed herein is the PHFE scheme for the class $$(\overset{\text{public}}{x}, \overset{\text{private}}{z}) \mapsto [zMf(x)^T]_T$$

parameterized by a matrix $[M]_2$, where encryption gets $[z]_1$, and the simulator gets $[zMf(x)^T]_2$. In fact, we present a scheme for a more general setting where the matrix $[M]_2$ is specified by the function corresponding to the secret key (that is, we allow a different $[M]_2$ for each secret key, rather than the same matrix for all keys). Here, the decryption algorithm only gets $[M]_2$ and not M. This scheme achieves simulation-based semi-adaptive security under k-Lin.

Partial Garbling Scheme

The partial garbling scheme for $zf(x)^T$ with $f \in \mathcal{F}_{ABP,n,n'}$ is a randomized algorithm that on input $f$ outputs an affine function in x, z of the form:

$p_{f,x,z} = (z - \underline{t} \| t(L_1(x^T \otimes I_m) + L_0))$ where $L_0 \in \mathbb{Z}_p^{t \times m}$, $L_1 \in \mathbb{Z}_p^{t \times m}$ depends only on $f$; $t \leftarrow \mathbb{Z}_p^t$ is the random coin and $\underline{t}$ consists of the last n' entries in t, such that given $(p_{f,x,z}, f, x)$, we can recover $zf(x)^T$, while learning nothing else about z.

Lemma 1 (Partial Garbling)

There exists four efficient algorithms (lgen, pgb, rec, pgb*) with the following properties:

(syntax) on input $f \in \mathcal{F}_{ABP,n,n'}$, lgen($f$) outputs $L_0 \in \mathbb{Z}_p^{t \times mn}, L_1 \in \mathbb{Z}_p^{t \times m}$, and $pgb(f, x, z; t) = (z - \underline{t} \| t(L_1(x^T \otimes I_m) + L_0))$ $pgb^*(f, x, \mu; t) = (-\underline{t} \| t(L_1(x^T \otimes I_m) + L_0) + \mu \cdot e_1)$ where $t \in \mathbb{Z}_p^t$ and $\underline{t}$ consists of the last n' entries in t and m, t are linear in the size of $f$.

(reconstruction) rec($f$, x) outputs $d_{f,x} \in \mathbb{Z}_p^{n'+m}$ such that for all $f$, x, z, t, $p_{f,x,z} d_{f,x}^T = zf(x)^T$ where $p_{f,x,z} = \text{pgb}(f, x, z; t)$.

(privacy) for all $f$, x, z, $pgb(f, x, z; t) \approx pgb^*(f, x, zf(x)^T; t)$ where the randomness is over $t \leftarrow \mathbb{Z}_p^t$.

Construction

We rely on partial garbling to compute pgb($f$, x, zM; t) instead of pgb($f$, x, z; t) "in the exponent" over $\mathbb{G}_T$; applying the reconstruction algorithm (which requires knowing $f$, x but not M) then returns $[zMf(x)^T]_T$.

Setup$(1^\lambda, 1^n, 1^{n'})$: Run $\mathbb{G} = (p, \mathbb{G}_1, \mathbb{G}_2, \mathbb{G}_T, e) \leftarrow \mathbb{G}(1^\lambda)$.
Sample $A \leftarrow \mathbb{Z}_p^{k \times (k+1)}$ and $W \leftarrow \mathbb{Z}_p^{(k+1) \times n}, U \leftarrow \mathbb{Z}_p^{(k+1) \times kn}, V \leftarrow \mathbb{Z}_p^{(k+1) \times k}$ and output $mpk = (\mathbb{G}, [A]_1, [AW]_1, [AU]_1, [AV]_1)$ and $msk = (W, U, V)$.

Enc(mpk, (x, z)): Sample $s \leftarrow \mathbb{Z}_p^k$ and output $$ct_{x,z} = ([sA]_1, [z+sAW]_1, [sAU(x^T \otimes I_k) + sAV]_1) \text{ and } x.$$

Note that it is sufficient for Enc to get $[z]_1$.

KeyGen(msk, (f, $[M]_2$)): Run $(L_1, L_0) \leftarrow \text{lgen}(f)$ where $L_1 \in \mathbb{Z}_p^{r \times nm}$, $L_0 \in \mathbb{Z}_p^{r \times m}$.

Sample $T \leftarrow \mathbb{Z}_p^{(k+1) \times t}$ and $R \leftarrow \mathbb{Z}_p^{k \times m}$ and output $sk_{f,M} = ([\underline{T}+WM]_2, [TL_1+U(I_n \otimes R)]_2, [TL_0+VR]_2, [R]_2)$ and $(f, [M]_2)$.

where $\underline{T}$ refers to the matrix composed of the right most n' columns of T.

Dec($sk_{f,M}$, (f, $[M]_2$), ($ct_{x,z}$, x)): On input key:

$$sk_{f,M} = ([K_1]_2, [K_2]_2, [K_3]_2, [R]_2) \text{ and } (f, [M]_2)$$

and ciphertext:

$$ct_{x,z} = ([c_0]_1, [c_1]_1, [c_2]_1) \text{ and } x$$

the decryption works as follows:

(a) compute $$[p_1]_T = e([c_1]_1, [M]_2) \cdot e([c_0]_1, [-K_1]_2) \quad (6)$$

(b) compute $$[p_2]_T = e([c_0]_1, [K_2(x^T \otimes I_m) + K_3]_2) \cdot e([-c_2]_1, [R]_2) \quad (7)$$

(c) run $d_{f,x} \leftarrow \text{rec}(f, x)$, compute $$[D]_T = [(p_1 \| p_2) d_{f,x}^T]_T \quad (8)$$

Correctness.

For $ct_{x,z}$ and $sk_{f,M}$, we have $$p_1 = zM - sA\underline{T} \quad (9)$$

$$p_2 = sATL_1(x^T \otimes I_m) + sATL_0 \quad (10)$$

$$(p_1 \| p_2) d_{f,x}^T = zMf(x) \quad (11)$$

Here (11) follows from the fact that $$(p_1 \| p_2) = pgb(f, x, zM; (sAT)) \text{ and } d_{f,x} = rec(f, x)$$

and reconstruction of the partial garbling. The remaining two equalities follow from:

$$z - sA\underline{T} = (z+sAW) \cdot I_n - sA \cdot (\underline{T} + W) \quad (9)$$

$$sATL_1(x^T \otimes I_m) + sATL_0 = sA \cdot ((TL_1 + U(I_n \otimes R))(x^T \otimes I_m) + (TL_0 + VR)) - (sAU(x^T \otimes I_k) + sAV) \cdot R \quad (10)$$

in which we use the equality $(I_n \otimes R)(x^T \otimes I_m) = (x^T \otimes I_k)R$. This readily proves the correctness.

Simulator

Setup*$(1^\lambda, 1^n, 1^{n'})$: Run $\mathbb{G} = (p, \mathbb{G}_1, \mathbb{G}_2, \mathbb{G}_T, e) \leftarrow \mathcal{G}(1^\lambda)$. Sample $$A \leftarrow \mathbb{Z}_p^{(k+1) \times k} \text{ and } W \leftarrow \mathbb{Z}_p^{(k+1) \times n'} \quad U \leftarrow \mathbb{Z}_p^{(k+1) \times kn} \quad V \leftarrow \mathbb{Z}_p^{(k+1) \times k}$$
$$c \leftarrow \mathbb{Z}_p^{k+1} \quad \tilde{w} \leftarrow \mathbb{Z}_p^{n'}, \quad , \quad \tilde{v} \leftarrow \mathbb{Z}_p^k$$

and output $$mpk = (\mathbb{G}, [A^T]_1, [A^TW]_1, [A^TU]_1, [A^TV]_1) \text{ and } msk^* = (W, U, V, \tilde{w}, \tilde{v}, c, C^\perp, A, a^\perp)$$

$$mpk = (\mathbb{G}, [A^T]_1, [A^TW]_1, [A^TU]_1, [A^TV]_1)$$

$$msk^* = (W, U, V, \tilde{w}, \tilde{v}, c, C^\perp, A, a^\perp)$$

where $(A|c)^T (C^\perp | a^\perp) = I_{k+1}$. Here we assume that (A|c) has full rank, which happens with probability $1 - 1/p$.

Enc*(msk*, x*): Output $$ct^* = ([c^T]_1, [\tilde{w}]_1, [\tilde{v}]_1) \text{ and } x^*.$$

KeyGen*(msk*, x*, (f, $[M]_2$), $[\mu]_2$): Run $(L_1, L_0) \leftarrow \text{lgen}(f)$ and $([p_1^*]_2, [p_2^*]_2) \leftarrow pgb^*(f, x^*, [\mu]_2)$.

Sample $T \leftarrow \mathbb{Z}_p^{(k+1) \times t}, \hat{u} \leftarrow \mathbb{Z}_p^{nm}$ and $R \leftarrow \mathbb{Z}_p^{k \times m}$ and output $$sk_f^* = (C^\perp \cdot sk_f^*[1] + a^\perp sk_f^*[2], [R]_2) \text{ and } f \quad (12)$$

where $$sk_f^*[1] = ([A^T\underline{T} + A^TWM]_2, [A^TTL_1 + A^TU(I_n \otimes R)]_2, [A^TTL_0 + A^TVR]_2)$$

$$sk_f^*[2] = ([-(p_1^*)^T + \tilde{w}M]_2, [\hat{u}^T]_2, [(p_2^*)^T - \hat{u}^T(x^* \otimes I_m) + \tilde{v}R]_2)$$

Here $\underline{T}$ refers to the matrix composed of the right most n' columns of T. That is, $$sk_f^* = \begin{pmatrix} [C^\perp(A^T\underline{T} + A^TWM) & +a^\perp(-(p_1^*)^T + \tilde{w}M)]_2, \\ [C^\perp(A^TTL_1 + A^TU(I_n \otimes R)) & +a^\perp(\hat{u}^T)]_2 & , [R]_2 \\ [C^\perp(A^TTL_0 + A^TVR) & +a^\perp((p_2^*)^T - \hat{u}^T(x^* \otimes I_m) + \tilde{v}R)]_2 \end{pmatrix}$$

Concrete Scheme for Quadratic Functions

A self-contained description of the functional encryption scheme for quadratic functions specified by $f \in \mathbb{Z}_p^{n_1 \times n_2}$ where $$z_1, z_2 \to (z_1 \otimes z_2) f^T$$

is presented.

The scheme is SA-SIM-secure under the bilateral k-Lin assumption and the k'-Lin assumption in $\mathbb{G}_1, \mathbb{G}_2$. For the most efficient concrete instantiation (cf. FIG. 1), we set k=2, k'=1.

Setup(p, $1^{n_1}, 1^{n_2}$): Run $\mathbb{G} = (\mathbb{G}_1, \mathbb{G}_2, \mathbb{G}_T, e) \leftarrow \mathcal{G}(p)$. Sample $$A_1 \leftarrow \mathbb{Z}_p^{k \times n_1}, A_2 \leftarrow \mathbb{Z}_p^{k \times n_2}, A_0 \leftarrow \mathbb{Z}_p^{k \times (k'+1)},$$
$$W \leftarrow \mathbb{Z}_p^{(k'+1) \times (k'n_1 + kn_2)},$$

and output $$mpk = (\mathbb{G}, [A_0]_1, [A_0W]_1, [A_1]_1, [A_1]_2, [A_2]_2 \text{ and } msk = W$$

Enc(mpk, $(z_1, z_2)$): Sample $s_1 \leftarrow \mathbb{Z}_p^k, s_0, s_2 \leftarrow \mathbb{Z}_p^{k'}$ and output $$ct = (\underbrace{[s_1A_1 + z_1]_1}_{y_1}, \underbrace{[s_2A_2 + z_2]_2}_{y_2}, \underbrace{[s_0A_0]_1}_{c_0}, \underbrace{[s_0A_0W + (s_1 \otimes z_2 \mid y_1 \otimes s_2)]_1}_{y_0}) \in$$

$$\mathbb{G}_1^{n_1} \times \mathbb{G}_2^{n_2} \times \mathbb{G}_1^{k'+1} \times \mathbb{G}_1^{k'n_1 + kn_2}$$

KeyGen(msk, f): Output $$sk_f = \left[ W \cdot \begin{pmatrix} (A_1 \otimes I_{n_2}) f^T \\ (I_{n_1} \otimes A_2) f^T \end{pmatrix} \right]_2 \in \mathbb{G}_2^{(k'+1) \times 1}$$

Dec($sk_f$, f, ct): Parse $sk_f = [k^T]_2$ and output the discrete log of $$[(y_1 \otimes y_2) \cdot f^T]_T \cdot e([c_0]_1, [k^T]_2) \cdot e\left( [y_0]_1, \left[ \begin{pmatrix} (A_1 \otimes I_{n_2}) f^T \\ (I_{n_1} \otimes A_2) f^T \end{pmatrix} \right]_2 \right)^{-1}$$

System Implementation

With reference to FIG. 1, an example system architecture is illustrated. A user (215) allows a remote server (210) to run a specific function F on a ciphertext by issuing a token $T_F$. The server executes F on an available ciphertext C and generates a result $R_F$ in an encrypted form. The system can include a trusted authority (TA) (220) who is responsible to construct a token $T_F$ for the requested function.

As illustrated, data owner (205) uploads ciphertext C onto the remote server (210). Data user (215) requests TA (220) for a token for a function (F). TA (220) issues token $T_F$ to the data user. Data user then sends $T_F$ to the server. Server runs F on the encrypted data, and forwards the result $R_F$ to the data user.

FIG. 2 illustrates an example self-contained description of the functional encryption scheme for quadratic functions specified by $f \in \mathbb{Z}_p^{n_1 \times n_2}$ where $$z_1, z_2 \mapsto (z_1 \otimes z_2) f^T$$

The scheme is SA-SIM-secure under the bilateral k-Un assumption and the k'-Lin assumption in $\mathbb{G}_1, \mathbb{G}_2$. For the most efficient concrete instantiation (cf. FIG. 1), we set k=2, k'=1.

Figure 3:
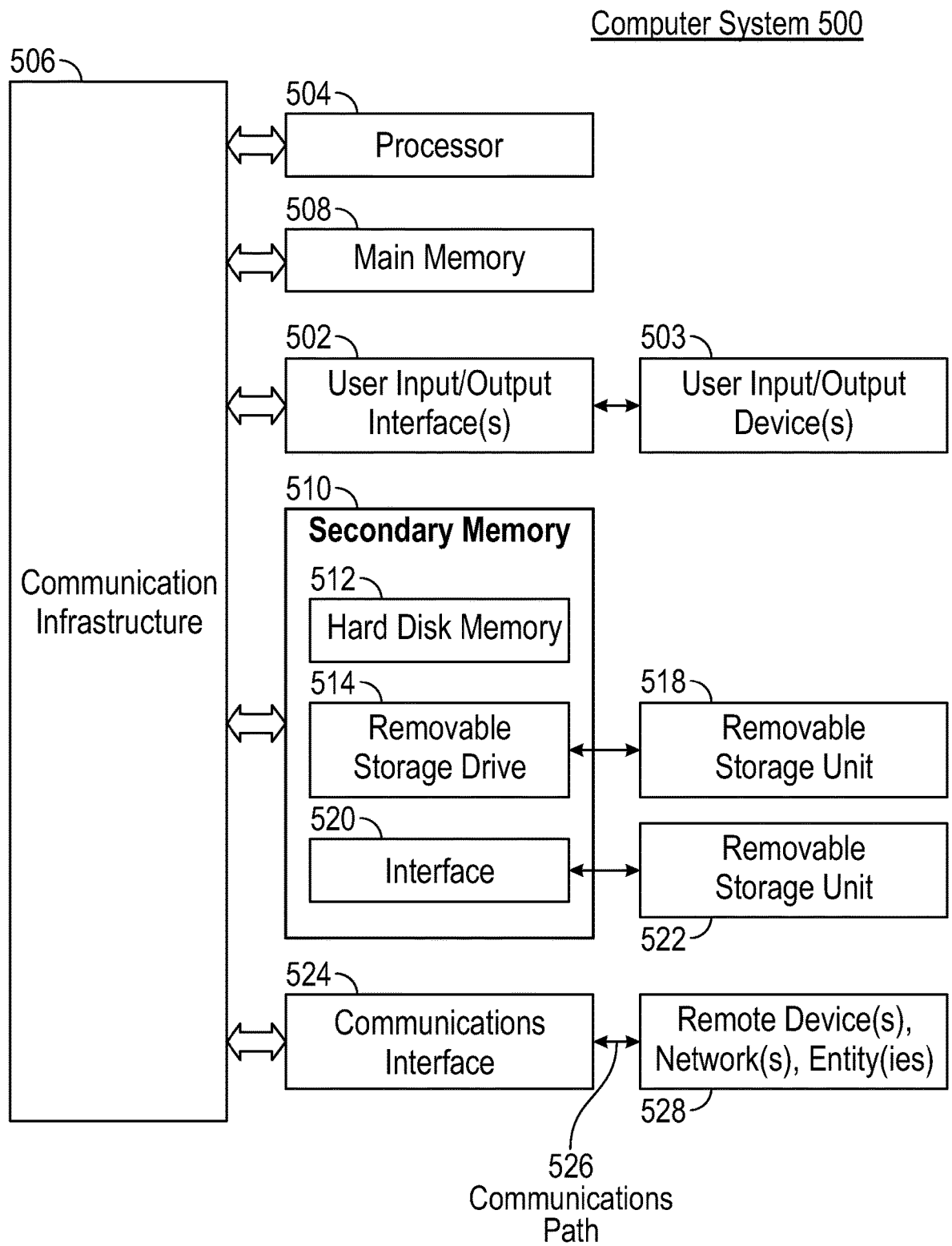
FIG. 3 illustrates an example computer system architecture for implementing the claimed systems and methods.
Figure 4:
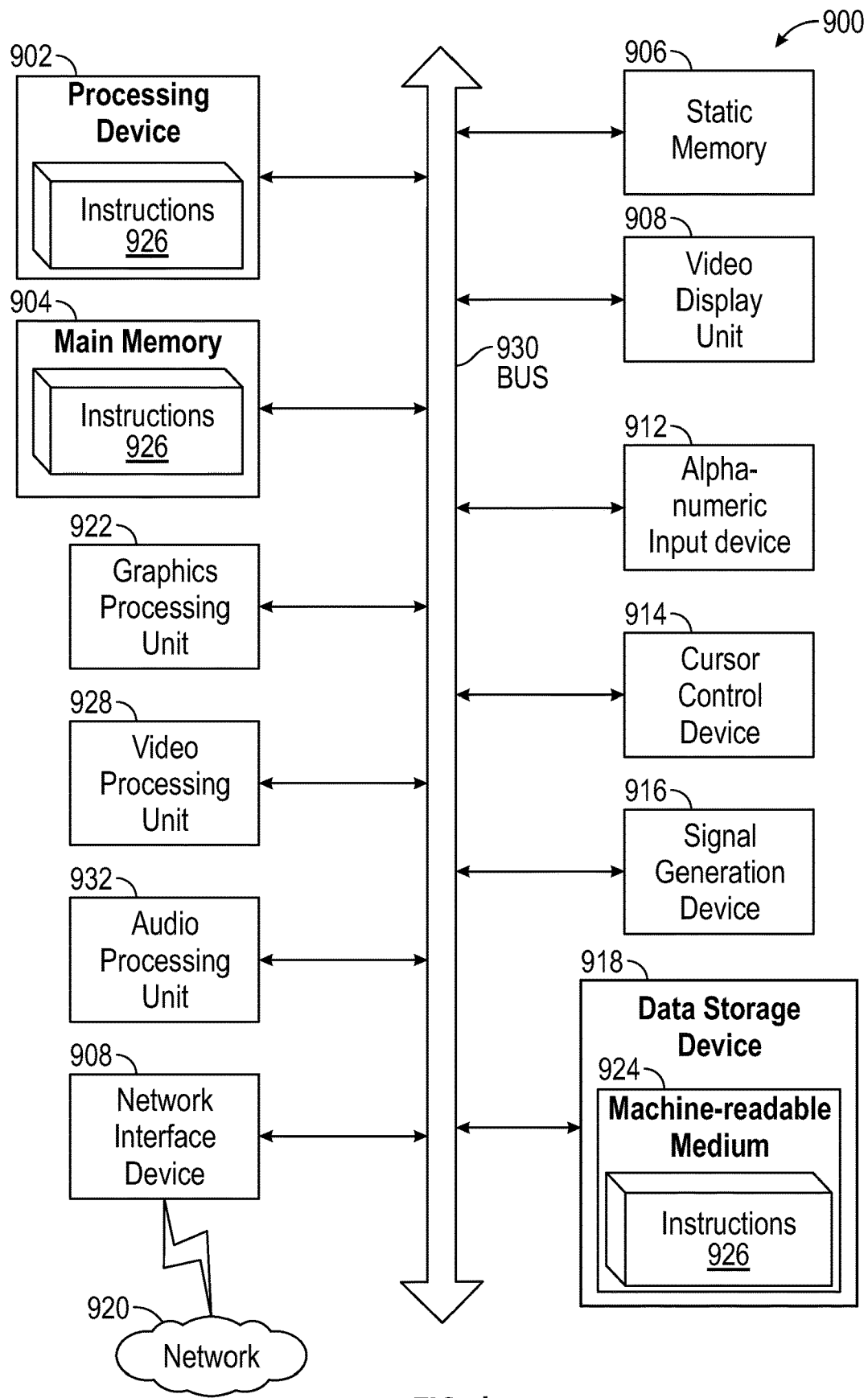
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for securing computation for 2nd degree polynomials by functional encryption, the method comprising:
   executing a computerized set-up algorithm that outputs a public key and a master secret key;
   executing a computerized key generation algorithm that receives the master secret key and a 2nd degree polynomial f, and outputs a secret key, wherein the polynomial f is a quadratic function;
   on a first computerized processor, executing an encryption algorithm that receives the public key and an electronic message, the electronic message comprising two vectors z1 and z2, both of length n, and outputs a ciphertext;
   on a second computerized processor at a location remote from the first computerized processor, receiving the ciphertext and the secret key over an electronic communications network, and executing a decryption algorithm based on the ciphertext and the secret key that outputs a decrypted value that is a same value as evaluating the 2nd degree polynomial f on the two vectors z1, z2;
   transmitting the decrypted value to the first computerized processor; and
   wherein the encryption and decryption algorithms are based on a bilateral k-linear assumption such that any computationally efficient process does not learn anything about the two vectors z1, z2 beyond the evaluation of the 2nd degree polynomial f.

2. The method of claim 1, wherein the set-up algorithm further comprises:
   executing a set-up algorithm of an ElGamal scheme twice to generate public keys w1 and w2 and secret keys sk1 and sk2;
   executing a set-up algorithm of a functional encryption scheme for a 1st degree polynomial scheme resulting in a public key w0 and a master secret key msk0; and
   generating as output the public keys w1, w2, w0 as the public key and the master secret key msk0 as the master secret key.

3. The method of claim 1, wherein the encryption algorithm further comprises:
   executing an encryption algorithm of an ElGamal scheme, wherein input to the ElGamal scheme of z1 comprises a public key w1 and a randomness s1, resulting in a ciphertext y1;
   executing the encryption algorithm of the ElGamal scheme, where input to the ElGamal scheme comprises a public key w2 and a randomness s2, resulting in a ciphertext y2;
   executing an encryption algorithm of a 1st degree polynomial scheme, wherein input to the 1st degree polynomial scheme comprises a public key w0 and a vector, the vector comprising a concatenation of the randomness s1 times the vector z2 and the ciphertext y1 times the randomness s2, resulting in a ciphertext y0; and
   generating output ciphertexts y1, y2, y0 as the ciphertext.

4. The method of claim 1, wherein the key generation algorithm executes:
   the key generation algorithm of a 1st degree polynomial scheme, wherein input to the 1st degree polynomial scheme comprises a master secret key msk0, and a degree 1 polynomial derived from the 2nd degree polynomial f, public keys w1 and w2, resulting in a secret key sk; and generating output with the secret key sk as the secret key.

5. The method of claim 1, wherein the decryption algorithm further comprises: receiving the ciphertext;
   parsing the ciphertext into components designated y1, y2, y0;
   receiving a secret key sk, wherein the secret key sk is generated by a 1st degree polynomial scheme;
   computing the 2nd degree polynomial f on the components y1 and y2, resulting in a value v1;
   decrypting the component y0 with the secret key sk using a decryption algorithm of the 1 st degree polynomial scheme resulting in a decrypted value v0; and
   generating output v1−v0 as the decrypted value.

6. The method of claim 1, wherein the $2^{nd}$ degree polynomial f is a privacy-preserving machine learning function executed in a neural network with a quadratic activation function.

7. The method of claim 1, wherein the $2^{nd}$ degree polynomial f is a quadratic function and is selected from one or more of a statistical function or a correlation function.

8. The method of claim 1, further comprising applying polynomials of the $2^{nd}$ degree polynomial f to projected vectors.

9. The method of claim 1, wherein:
   the electronic message is arranged and stored as a relational database, the database being logically arranged in a data model that is compatible with operations performed by a specified function;
   the secret key defines a subset of data in the relational database; and
   the decryption algorithm performs the specified function on the subset of the data.

10. A computerized system for securing computation for 2nd degree polynomials by functional encryption, the system comprising:
    one or more computerized processors configured for executing:
    a set-up algorithm that outputs a public key and a master secret key; and
    a key generation algorithm that receives the master secret key and a 2nd degree polynomial f, and outputs a secret key, wherein the polynomial f is a quadratic function;
    a computerized encryption processor configured for executing an encryption algorithm that receives the public key and an electronic message, the electronic message comprising two vectors z1 and z2, both of length n, and outputs a ciphertext;
    a computerized decryption processor, at a location remote from the computerized encryption processor, configured for receiving the ciphertext and the secret key over an electronic communications network, and executing a decryption algorithm based on the ciphertext and the secret key that outputs a decrypted value that is a same value as evaluating the 2nd degree polynomial f on vectors z1, z2; and
    storing the decrypted value to a non-transitory computerized storage medium; and
    wherein the encryption and decryption algorithms are based on a bilateral k-linear assumption such that any computationally efficient process does not learn anything about z1, z2 beyond the evaluation of the 2nd degree polynomial f.

11. The system of claim 10, wherein the set-up algorithm further comprises:
    executing a set-up algorithm of an ElGamal scheme twice to generate public keys w1 and w2 and secret keys sk1 and sk2;
    executing a set-up algorithm of a functional encryption scheme for a 1st degree polynomial scheme resulting in a public key w0 and a master secret key msk0; and
    generating output public keys w1, w2, w0 as the public key and the master secret key msk0 as the master secret key.

12. The system of claim 10, wherein the encryption algorithm further comprises: executing an encryption algorithm of an ElGamal scheme, wherein input to the ElGamal scheme of z1 comprises public key w1 and randomness s1, resulting in a ciphertext y1;
    executing the encryption algorithm of the ElGamal scheme, where input to the ElGamal scheme comprises a public key w2 and a randomness s2, resulting in a ciphertext y2;
    executing an encryption algorithm of a 1 st degree polynomial scheme, wherein input to the 1st degree polynomial scheme comprises a public key w0 and a vector, the vector comprising a concatenation of the randomness s1 times the vector z2 and y1 times s2, resulting in a ciphertext y0; and
    generating output ciphertexts y1, y2, y0 as the ciphertext.

13. The system of claim 10, wherein the key generation algorithm executes:
    the key generation algorithm of a 1st degree polynomial scheme, wherein input to the 1st degree polynomial scheme comprises a master secret key msk0, and a degree 1 polynomial derived from the second degree polynomial f, public keys w1 and w2, resulting in a secret key sk; and
    generating output sk as the secret key.

14. The system of claim 10, wherein the decryption algorithm further comprises:
    receiving the ciphertext;
    parsing the ciphertext into components designated y1, y2, y0;
    receiving a secret key sk, wherein the secret key sk is generated by a 1st degree polynomial scheme;
    computing the 2nd degree polynomial f on components y1 and y2, resulting in a value v1;
    decrypting y0 with sk using a decryption algorithm of the 1st degree polynomial scheme resulting in a decrypted value v0; and
    generating output v1−v0 as the decrypted value.

15. The system of claim 10, wherein the $2^{nd}$ degree polynomial f is a privacy-preserving machine learning function executed in a neural network with a quadratic activation function.

16. The system of claim 10, wherein the $2^{nd}$ degree polynomial f is a quadratic function and is selected from one or more of a statistical function or a correlation function.

17. The system of claim 10, further comprising applying polynomials of the $2^{nd}$ degree polynomial f to projected vectors.

18. The system of claim 10, wherein:
    the electronic message is arranged and stored as a relational database, the database being logically arranged in a data model that is compatible with operations performed by a specified function;

the secret key defines a subset of data in the relational database; and the decryption algorithm performs the specified function on the subset of the data.

* * * * *